Oct. 9, 1956  S. R. JOHNSON  2,765,599
CAN ARRANGING AND WRAPPING METHOD AND APPARATUS
Filed April 17, 1952  6 Sheets-Sheet 1

INVENTOR
Scott R. Johnson

BY Mason, Porter, Diller & Stewart
ATTORNEY

Oct. 9, 1956  S. R. JOHNSON  2,765,599
CAN ARRANGING AND WRAPPING METHOD AND APPARATUS
Filed April 17, 1952  6 Sheets-Sheet 3

INVENTOR
Scott R. Johnson
BY Mason, Porter, Diller & Stewart
ATTORNEY

Oct. 9, 1956   S. R. JOHNSON   2,765,599
CAN ARRANGING AND WRAPPING METHOD AND APPARATUS
Filed April 17, 1952   6 Sheets-Sheet 4

INVENTOR
Scott R. Johnson
BY Mason, Porter, Diller & Stewart
ATTORNEY

Oct. 9, 1956 S. R. JOHNSON 2,765,599
CAN ARRANGING AND WRAPPING METHOD AND APPARATUS
Filed April 17, 1952 6 Sheets-Sheet 5
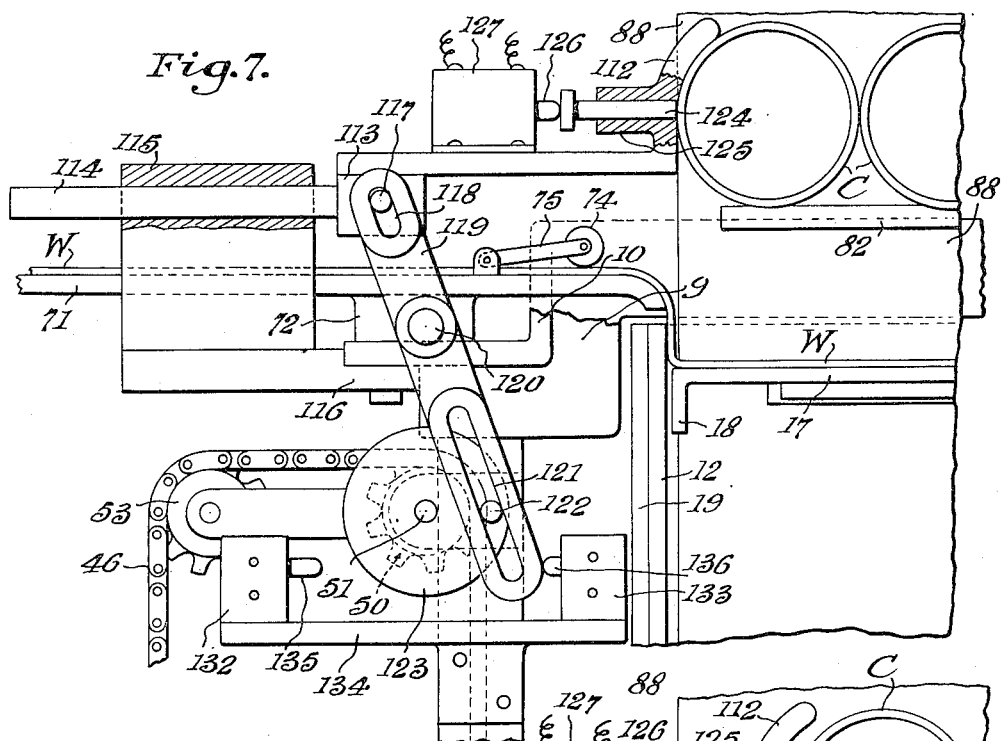
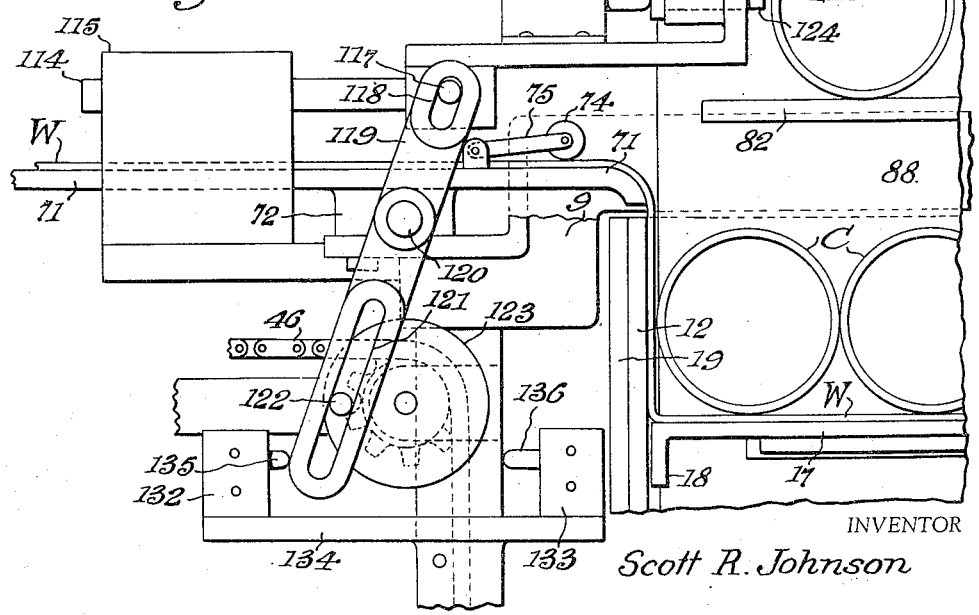
INVENTOR
Scott R. Johnson
BY Mason, Porter, Diller & Stewart
ATTORNEY Oct. 9, 1956  S. R. JOHNSON  2,765,599
CAN ARRANGING AND WRAPPING METHOD AND APPARATUS
Filed April 17, 1952  6 Sheets-Sheet 6
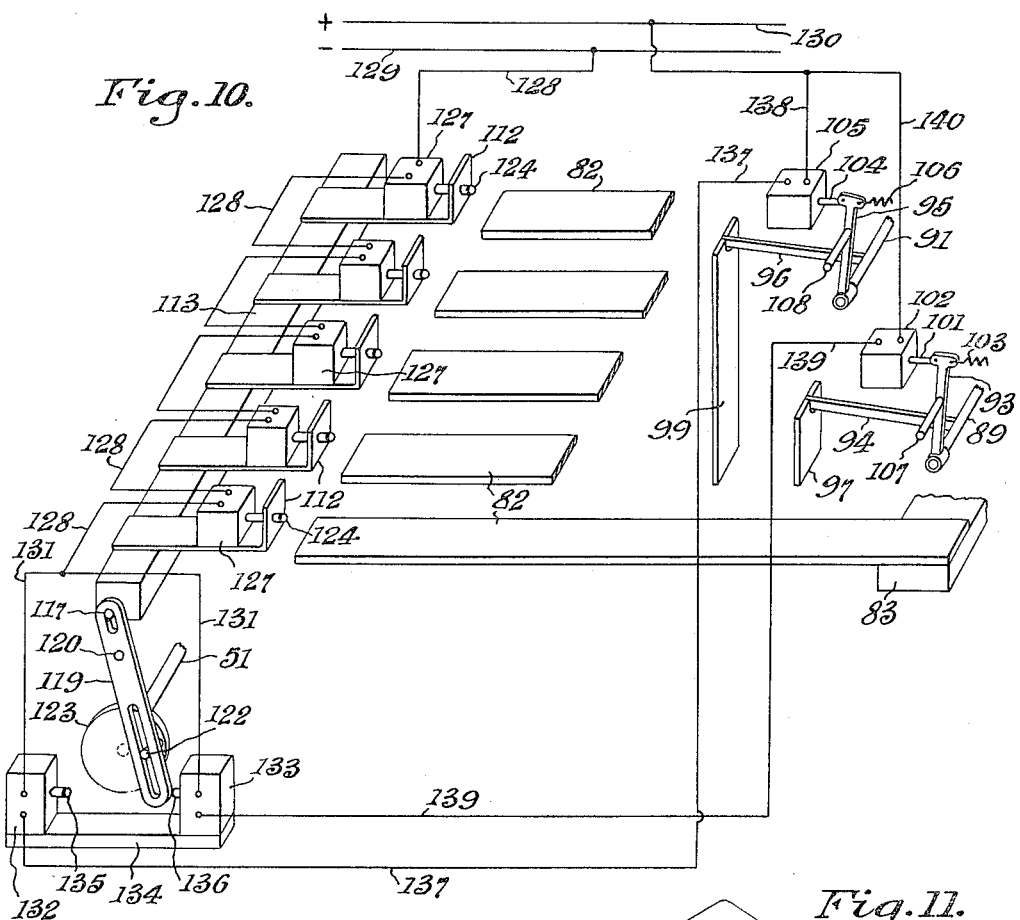
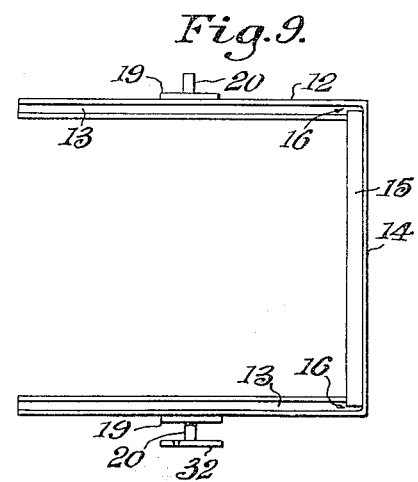
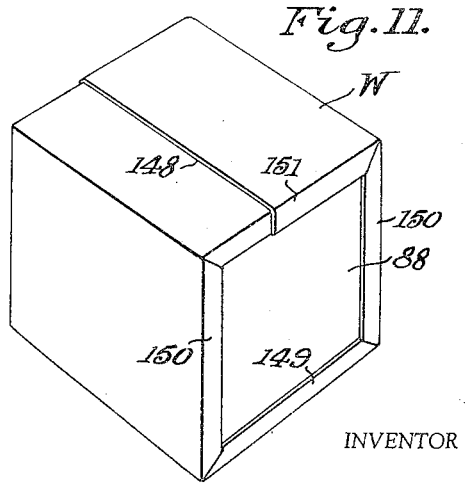
INVENTOR
Scott R. Johnson
BY
ATTORNEY

United States Patent Office 2,765,599
Patented Oct. 9, 1956

2,765,599

CAN ARRANGING AND WRAPPING METHOD AND APPARATUS

Scott R. Johnson, River Forest, Ill., assignor to Continental Can Company, Inc., New York, N. Y., a corporation of New York Application April 17, 1952, Serial No. 282,886

30 Claims. (Cl. 53—26)

The invention relates generally to the art of manufacturing cans and primarily seeks to provide a novel method of and apparatus for arranging cans in staggered and nested row and layer relation, and for placing wrappers about package complements of cans so arranged in order to facilitate handling, shipping and storage of the cans.

In the can manufacturing art great progress has been made in the production of efficiently operating body making and bottoming machinery, and cans are manufactured with great rapidity. The production of efficiently operating can handling methods and apparatus have not kept pace, and much wastage of time and labor is entailed in the handling of cans after they have been manufactured. It is commonly known that the labor cost of handling manufactured cans incidental to shipment and storage is greater than the labor cost incidental to the manufacturing of the cans. Much effort has been expended by workers in the art in attempts to develop handling methods and apparatus which will, to some extent at least, relieve this objectionable situation. One purpose has been to package groupings of cans in paper bags or wrappers. This greatly facilitated the handling, shipping and storage of cans, but there remains much room for improvement in the packaging of cans. When the can groupings have been packaged in preformed bags, loose packaging has been the result, and tearing and breakage has resulted because of the freedom of the packaged cans to move about in the encasing paper. In an effort to avoid this last named difficulty the cans have been arranged for packaging in staggered and nested row relation, thereby to provide smaller, tighter and more compact packages. This effort has been improved by the packaging of the can groupings in wrappers which could be drawn rather tight about the grouped cans, and it is a purpose of the present invention to provide a novel method of and apparatus for successively arranging layers of cans, each layer being composed of a plurality of rows of cans lying on their sides, and superposing layers of cans so arranged one upon another with the cans of each layer staggered and nested with relation to those of overlying or underlying layers.

Another object of the invention is to provide a novel method and apparatus of the character stated in which the wrapper is at least partially formed about the grouping or package complement of cans as it is being assembled layer upon layer.

Another object of the invention is to provide a novel method and apparatus of the character stated in which the cans are rolled into place on their sides and in individual rows on removable supports in the forming of layers, and in which the superposing of the layers is accomplished by removing said supports to let the cans of a layer fall onto a receiver, and lowering the receiver step-by-step to successively provide clear spaces in which to receive subsequently and successively formed layers as they are allowed to fall onto the previously formed layers by successive removal of the supports from beneath the same.

Another object of the invention is to provide a novel method and apparatus of the character stated in which the staggering and nesting of the successively formed layers of cans is accomplished by causing the can rows to roll against end stops which are aligned in the arrangement of the cans of each successively formed layer but are simultaneously movable back and forth the distance of half a can diameter preparatory to the successive formation of the layers so that the cans of each layer will be staggered and nested with relation to those of overlying or underlying layers.

Another object of the invention is to provide a novel method and apparatus of the character stated in which the first laid layer of cans is deposited upon the wrapper in which the particular grouping of cans is to be packaged, and in which said wrapper is automatically formed about the sides of the can grouping as the receiver is lowered layer by layer.

Another object of the invention is to provide a novel method and apparatus of the character stated in which the wrapper is not only formed about the sides of the can grouping incidental to the lowering of the receiver, but also has a portion of an end fold formed incidental to such lowering.

Another object of the invention is to provide a novel method and apparatus of the character stated in which the lowering of the receiver and the can layers thereon step-by-step is automatically accomplished by action of gravity on the layers of cans as they are successively deposited on the receiver.

Another object of the invention is to provide in apparatus of the character stated novel counterpoise means for counterbalancing the weight of the receiver and the can layers successively deposited so that as each layer of cans is deposited on the receiver it will overbalance the load then on the receiver and cause it to move down the predetermined step relation.

Another object of the invention is to provide in apparatus of the character stated means for placing tier sheets in position for resting uprightly between and endwise of the rows of cans in each layer and for moving down with the receiver and the can layers thereon as the layers are successively formed.

Another object of the invention is to provide in apparatus of the character stated means operable incidental to the step-by-step lowering of the receiver for shifting the can row placing stops so as to bring about the before-mentioned staggering and nesting of the rows and layers.

Another object of the invention is to provide in apparatus of the character stated a pair of projectable and retractable gates associated with each rolling row of cans for stopping infeeding of cans into the row after the predetermined complement of the row has been assembled over the receiver, the gates of each said pair being placed for cooperation with one of the before mentioned end stops for determining the number of cans to be arranged in a particular row and spaced apart half the diameter of a can and being projectable and retractable in timed relation to the shifting of said end stops so that when one said gate is retracted the other will be projected and so spaced with relation to the shifted position of the cooperating end stop as to trap a definite number of cans in the row formed between said end step and projected gate, and when the positions of the projected and retracted gates are reversed, the spaced relation of the then projected gate and the then shifted position of said cooperating end stop will be such as to trap one less can in the row between said end stop and gate and place the row in staggered relation to an underlying row.

Another object of the invention is to provide apparatus of the character stated wherein the same means which controls the positioning of the end stops also controls the projection and retraction of the gates.

Another object of the invention is to provide an apparatus of the character stated wherein the can layer receiver is in the form of a platen comprising the removable floor of a rectangular form dimensioned to receive the predetermined package complement of can layers, there being included means for supporting the platen so that it can move downwardly step-by-step within the form as the layers of cans are successively deposited thereon, and means for connecting the platen with the form after it has been lowered the final step to fill the form with its complement of can layers so that the form including the platen and the can layers thereon can be moved away to a wrapping station where the wrapping of the paper wrapper about the cans can be completed.

Another object of the invention is to provide an apparatus of the character stated wherein the can layer receiving form is mounted on a rollable dolly so that it can be conveniently transported to the station at which the wrapping is to be completed, said form being tiltably mounted on the dolly so that it can be conveniently tilted to make the wrapper ends accessible for sealing purposes, and also to facilitate delivery of the completed package from the form.

Another object of the invention is to provide an apparatus of the character stated wherein a pair of dollies and can layer receiving forms thereon are employed so that they can be shuttled back and forth between the can layer receiving position and the wrapper completing station, thereby to permit the loading of one dolly while the wrapping of the previously loaded can complement is being completed on the other dolly.

A further object of the invention is to provide an apparatus of the character stated wherein the platen supporting means comprises a support plate mounted on the upper end of a center post projecting upwardly from a transverse yoke having crossheads at its ends slidable in vertical guides and connected with the counterpoise means, and wherein each dolly includes a frame having an open portion for clearing the yoke as the dolly is moved in from the respective side of the apparatus, said dollies being movable in and out at opposite sides of the apparatus.

A still further object of the invention is to provide an apparatus wherein is included a latch means which automatically functions to secure the yoke in the support plate lowered position as a dolly is to be rolled away from the loading or can receiving position to the wrapper completing station, thereby to prevent lifting of the plate by the counterpoise means as the weight of the cans is removed from said plate, and means for manually releasing the latch means to permit such lifting of the plate to the initial platen supporting and can layer receiving position after the rolling in of the dolly and form next to receive its package complement of cans.

With the above and other objects in view that will hereinafter appear, the invention will be more clearly understood by following the detailed description, the appended claims and the several views illustrated in the accompanying drawings.

In the drawings:

Figure 1 is an end view of the apparatus, the can runways over which the individual rows of cans roll onto the individual row supports being shown in vertical cross section, one dolly and its supported form being in position for receiving its package complement of successively laid and staggered and nested can layers, and the other dolly being shown as moving away to the station at which the wrapping or packaging of the cans is to be completed.

Figure 7 is an enlarged fragmentary side elevation showing a row of cans completing its run onto its supporting bar and against the end stop and actuating the gate position controlling switch, the end stop being shown in the short row controlling position, and parts being broken away and in section.

Figure 8 is a view similar to Figure 7, one layer of cans having been deposited onto the platen, and a row of cans being shown as completing its run onto its supporting bar and about to actuate the gate position controlling switch, and the end stop being shown in the long row controlling position.

Figure 9 is a detail plan view illustrating one of the tiltably mounted forms.

Figure 10 is a diagrammatic perspective view illustrating the means for controlling the positioning of the end stops and gates for laying alternately long and short rows and layers of cans.

Figure 11 is a detail perspective view illustrating a completed package of cans.

Figure 1:
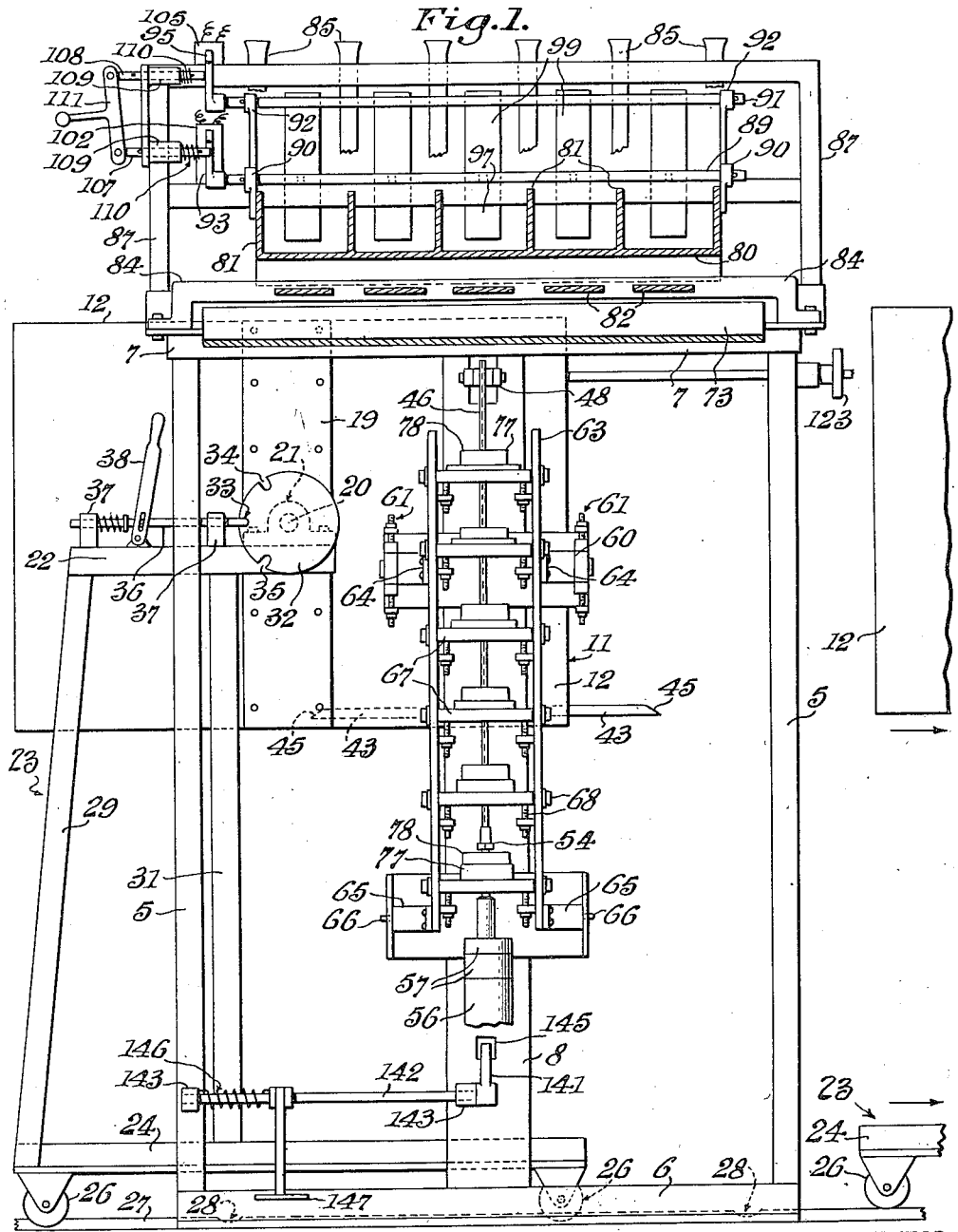

In the example of embodiment of the invention herein disclosed, the machine structure is shown as including a frame composed of corner uprights 5 joined in pairs at their lower ends by longitudinal floor angles 6, and also joined in pairs at their upper ends by longitudinal angles 7. The angles 6—6 and 7—7 at each side are joined by an intermediate upright guide channel 8, and the uprights are also joined in pairs at their upper ends by traversing or end angles 9 which are upwardly offset intermediately of their ends as at 10 to clear the upper ends of the can complement receiving form generally designated 11.

The receiving form generally designated 11 includes a pair of upright, parallel side walls 12 each having an inwardly directed ledge or U-shaped channel 13 at its lower extremity. The walls 12 are joined at one end by an end wall 14 having a block 15 attached thereto and spaced at its edges from the side walls 12 so as to provide a clearance 16 thereabout. The purpose of this clearance will become apparent as the description progresses. The form provided by the side walls 12 and the end wall 14 is open at its bottom except for the removable platen 17 which is movable vertically within the form during the loading thereof with cans and is equipped with downwardly turned edges 18 receivable in the grooves or channels 13 at the lower extremities of the side walls 12 in the manner indicated in Figure 2.

The form just described is shown in detail in Figures 1 to 3 and 9, and it will be noted that it has reinforcing plates 19 secured vertically at the central portion of the side walls 12, trunnions 20 projecting outwardly from said reinforcing plates and being rockably received in bearings 21 on the upper horizontal rails 22 of a removable dolly generally designated 23. Two such dollies are provided and are adapted to be shuttled back and forth for loading and unloading purposes in a manner to be described hereinafter, and it will be noted that each also includes lower horizontal rails 24 which are connected by a single cross piece 25 and which have flanged rollers 26 secured to depend therefrom. The rollers are disposed to roll and be guided by floor rails 27 secured to the floor and having depressions 28 therein to receive the depending dolly rollers and accurately place the dolly with relation to the various mechanisms of the apparatus. End uprights 29 of each dolly are braced as at 30, and intermediate uprights 31 also are provided. It will be apparent by reference to Figures 1 to 3 of the drawings that the frame portions of each dolly are arranged to form a sort of C-framing which is open toward one side, the right hand side as viewed in Figure 3 and with respect to the dolly shown at the left in Figure 1, and the left hand side with respect to the portion of the other shuttle dolly shown at the right in Figure 1. The purpose of this open sided formation of the dolly will become apparent as the function of the dolly is described in greater detail hereinafter.

It will also be noted that each dolly has a lock disk 32 secured on one of its trunnions 20, said disk having a center notch 33, an upper notch 34 and a lower notch 35, as best shown in Figure 1. A spring detent 36 slidably supported as at 37 on one of the upper rails 22 and operable by a handle 38 is engageable selectively with the notches 33, 34, 35 to hold the tiltably mounted form in the normally horizontal position shown in Figures 1 to 3, or in tilted position with a given end thereof tilted upwardly or downwardly, for a purpose to be described hereinafter.

Figure 2:
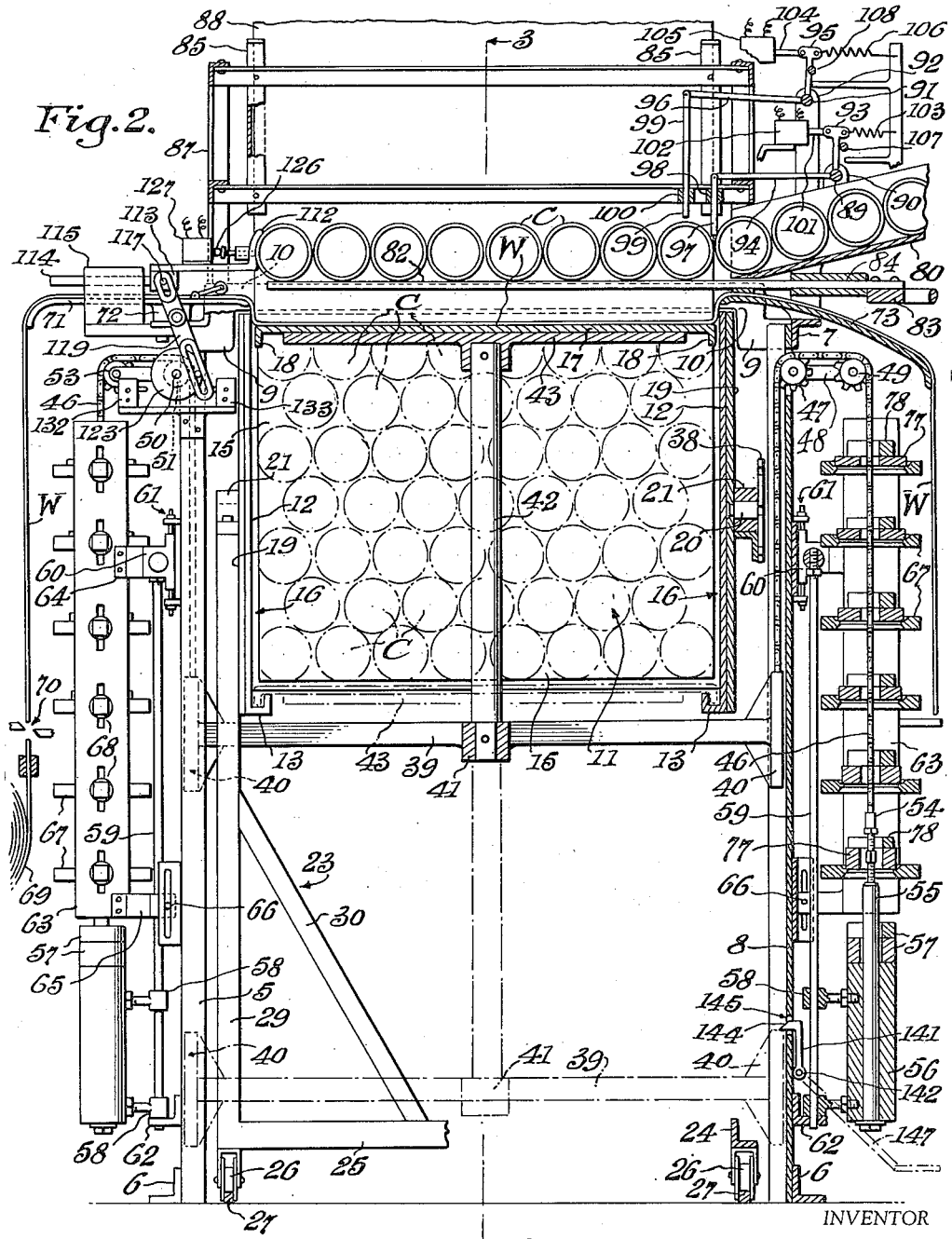
Figure 2 is a side elevation and part central vertical cross section of the apparatus shown in Figure 1, the form and the counterpoise devices at one side being shown in section, and the counterpoise devices at the other side being shown in elevation.

Attention is directed to Figures 1 and 2 from which it will be apparent that a platen supporting yoke 39 is provided and is equipped with a cross head 40 at each end, said cross heads being vertically slidable in the upright channel guides 8. The yoke includes a center socket 41 in which is mounted an upright center support post 42 on the upper end of which the platen support plate 43 is attached. The plate 43 and the platen 17 comprise a plate structure of which the platen constitutes a removable element, and it will be noted that the plate 43 is receivable in a recess 44 in the bottom of the platen and has bevelled edge portions 45 for facilitating clearance of the plate from the platen when the dolly is rolled away, taking with it the platen 17. It is to be understood that the form is loaded with its complement of can layers, the platen 17 moving downwardly step-by-step from the position illustrated in full lines in Figures 2 and 3 to the fully loaded position illustrated in dot and dash lines in Figure 2, and when a given dolly has been thus loaded, it will be moved away over the tracks 27 so that the wrapping and sealing of the package can be completed at a sealing station while another form or another dolly is being loaded in the apparatus. In Figure 1 a loaded dolly is illustrated as being rolled away at the right of the figure, and a dolly is shown at the left of the figure as being moved into position for having its form loaded with cans. As each dolly is moved away from the can receiving position, the moving of the rollers 26 out of the rail recesses 28 tends to lift the dolly and platen 17 slightly with relation to the plate 43 and facilitate clearance of the platen from said plate.

Figure 4:
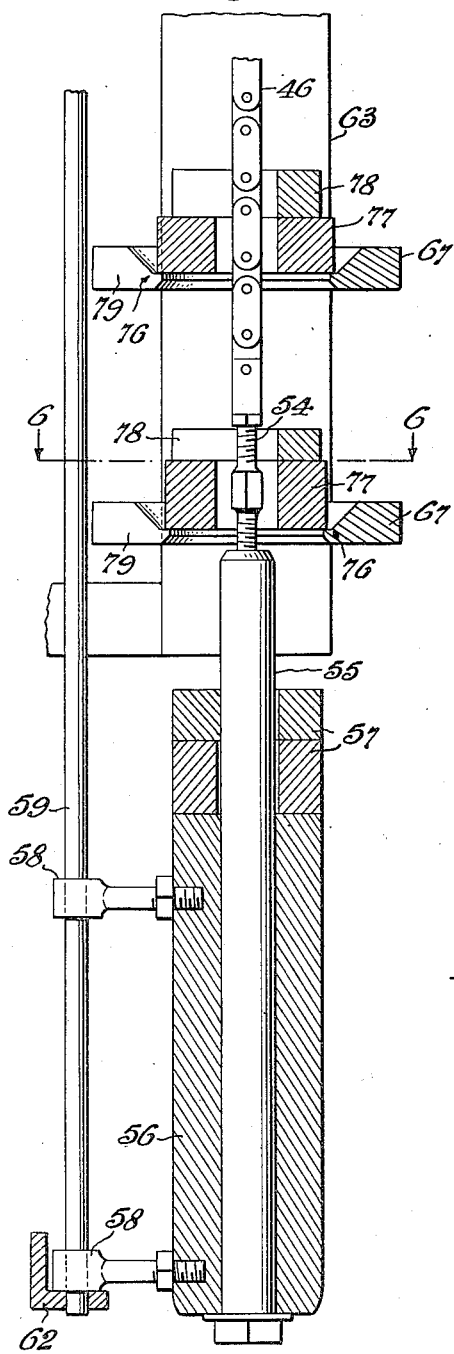
Figure 4 is an enlarged fragmentary vertical sectional view illustrating a portion of the counterpoise means, the base weight being shown at its fully lowered position.
Figure 5:
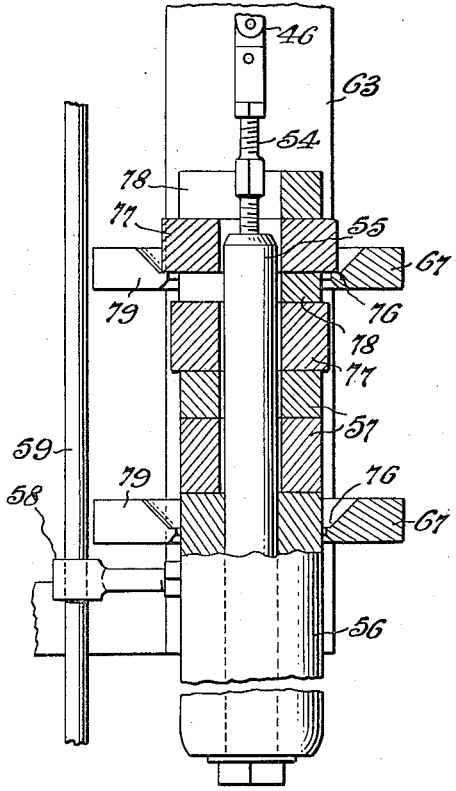
Figure 5 is a view similar to Figure 4, the successive picking up of weights to control the step-by-step lowering of the platen being illustrated.
Figure 6:
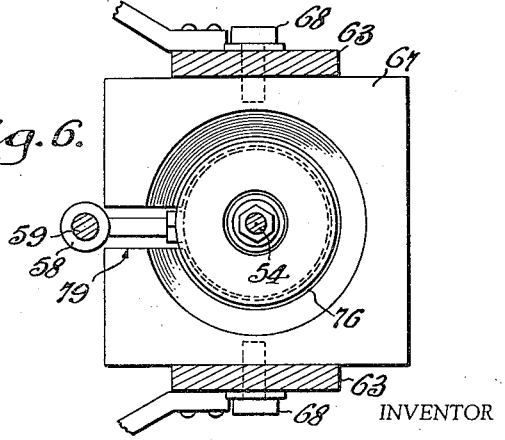
Figure 6 is a detail horizontal section taken on the line 6—6 on Figure 4.

A flexible carrier such as a chain 46 is secured to the upper end of each cross head 40, and one said chain passes upwardly and over an idler sprocket 47 supported at 48 on the frame structure, and turns outwardly and then downwardly over another idler sprocket 49 similarly supported on the frame. The other chain passes upwardly over a driver sprocket 50 as shown at the left in Figure 2 and in Figure 7, said sprocket being mounted on a longitudinal shaft 51 which is rotatably supported at 52 on the frame structure. After passing over the sprocket 50, said chain passes downwardly over an idler sprocket 53 similarly supported on the framing. Each of the chains 46 is adjustably connected at its lower end extremity at 54 to a base weight support rod 55 whereon a base weight 56 is mounted, together with one or more removably mounted weights 57. The weight sets 56, 57 serve as counterpoise means counterbalancing the weight of the cross head 39 and the plate 43 and platen 17 supported thereby and serve to hold these parts at any elevation to which they are moved. Guides 58 are secured to and project from each base weight 56 and are slidable on vertical guides 59. Each guide 59 is suspended from a block 60 which is vertically adjustably mounted at 61 on the respective guide channel 8, and the lower end of each guide 59 is received in an aperture in a cross angle 62 secured to the uprights 5 at the particular side of the apparatus. The angles 62 serve as downward movement limiting means for the base weights 56, as will be apparent by reference to Figures 2 and 4 of the drawings.

Each guide supporting block 60 also supports spaced parallel upright bars 63 attached thereto near their upper end as at 64. The bars of each pair are also secured at 65 to brackets near their lower ends, through slot and pin connections 66. Between each pair of bars 63 is mounted a vertically spaced plurality of weight supporting rings 67, each said ring being vertically-adjustably supported at 68 on said bars. The weight supporting rings are spaced can layer depths apart, and the number thereof is selected in accordance with the number of can layers to be included in a package or the number of steps through which the form is to be lowered in receiving the successively laid can layers.

A paper web roll supply may be provided at 69, and the web W drawn from this roll passes upwardly through suitably operable wrapper severing knives 70 onto a horizontal guide 71 supported on the machine framing as at 72 at one side of the apparatus, and over a generally horizontal guide 73 similarly supported at the opposite side of the apparatus in the manner clearly illustrated in Figure 2. A drag roll 74 may be provided and suitably supported on links 75 over the guide 71 to aid in controlling the drawing of the web over the guides and the holding of the web in position on the guides in the manner illustrated in Figure 2.

It will be noted by reference to Figures 2 and 4 through 6 of the drawings that the weight supporting rings or plates 67 have center openings or weight supporting seats 76 formed therein, and these are of progressively increasing diameters, the ring opening which is lowermost in Figure 2 being the smallest. One or more selective supplementary weights 77, 78 are mounted on each ring 67, and these preferably have radial slots formed therein in order to facilitate mounting and removal thereof. It will be noted also that the rings 67 have radial slots 79 therein for clearing the base weight guides 58.

Cans C are rolled on their sides into the apparatus on conveyor means generally designated 80 which may be in the form of individual runways divided by upright walls 81. In this example illustration five such can runways are provided and five rows of cans are shown as comprising a layer of cans which is to be arranged over and then lowered step-by-step into the form. The five rows of cans roll onto support bars 82 which project in the manner clearly illustrated in Figures 1, 2, 3 and 10 of the drawings form a shifter cross head 83, said bars being slidable through guide means 84 so as to be projectable into and retractable from the can row receiving position shown in Figure 2. It will be apparent that when the operator retracts the bars 82 the layer of cans formed thereon in the manner illustrated in Figures 2 and 3 will fall onto the platen 17 and the wrapper W thereon, or onto a previously laid layer of cans, one can in each row at a time as the bars are withdrawn to the right as viewed in Figure 2.

Figure 3:
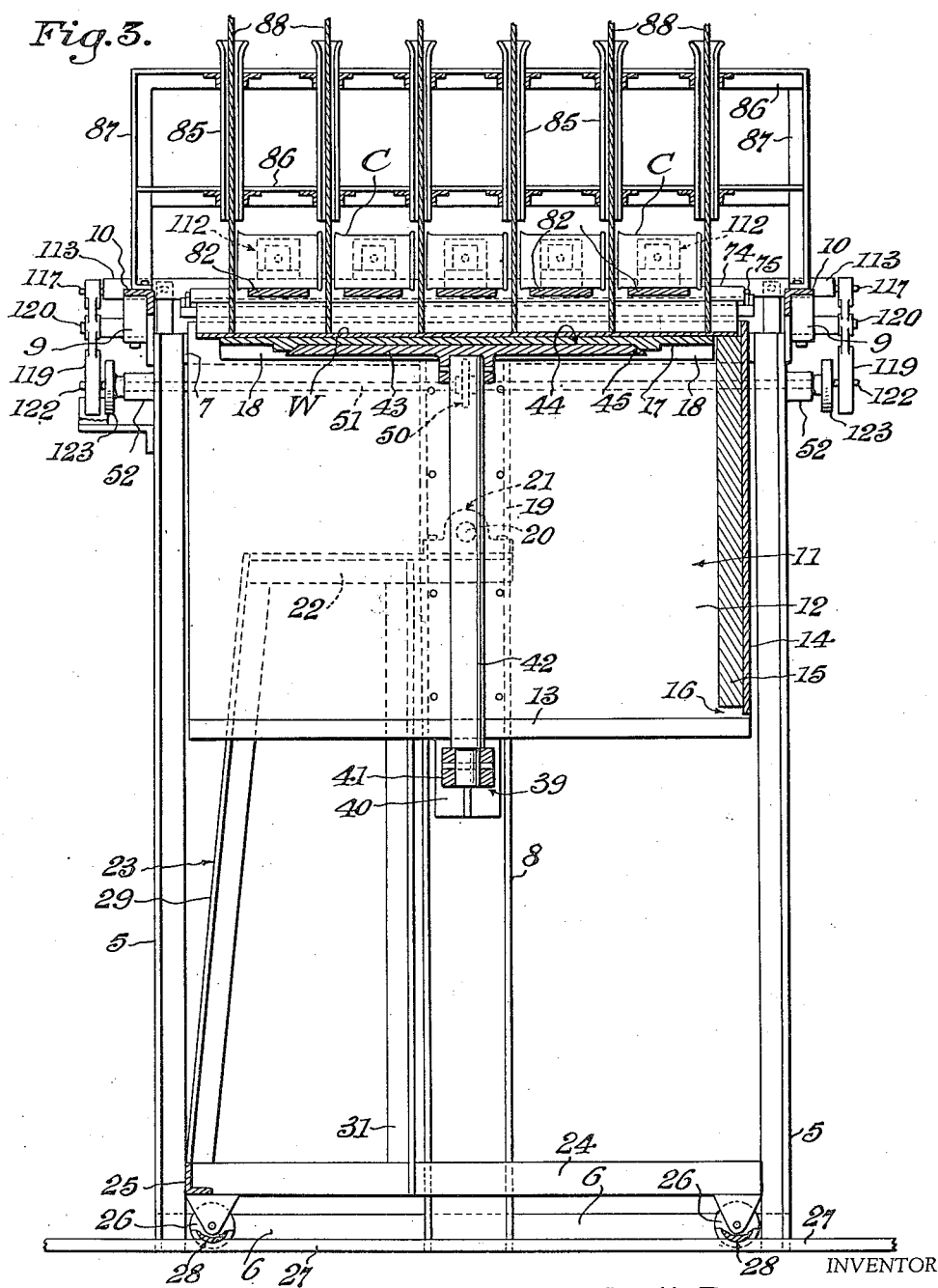
Figure 3 is a vertical sectional view taken on the line 3—3 on Figure 2.

Tier sheet guides 85 are provided and are supported on cross bars 86 of the upper frame extension 87 in the manner best illustrated in Figures 1, 2 and 3 of the drawings, and through these guides tier sheets 88 are deposited between and endwise of the plurality of rows of cans so as to form partitions between adjacent rows and a closure at each end of the complement of cans. It will be apparent by reference to Figure 3 that as the platen is lowered the tier sheets 88, resting on the wrapper W supported by the platen will move downwardly therewith, continuing to serve as guides between which the individual rows of cans can be rolled into position.

At one side of the apparatus, the right hand side as viewed in Figure 2, or in other words the side from which the cans enter, a lower rock shaft 89 is provided, rockably supported in bearings 90, and also an upper rock shaft 91, rockably supported in bearings 92. The lower shaft 89 has a crank 93 secured in upright position thereon, and also a plurality of horizontally projecting arms 94, one over each can row or support bar 82. The upper shaft 91 also has a crank 95 secured uprightly thereon and is similarly equipped with horizontally projecting arms 96 corresponding in number to the can rows. The first mentioned horizontal arms 94 are connected at their free ends with upright gates 97 which are slidable in guides 98 supported on the framing, and the horizontal arms 96 are connected at their upper ends with upright gates 99 which are slidable in guides 100. It will be apparent by reference to Figure 2 that the gates 97 and 99 of each pair are projectable and retractable across the path of can rows being arranged on a particular support bar 82, and are spaced apart laterally a distance equivalent to the radius of a can. The purpose of this spacing will later become apparent.

The upright crank 93 on the shaft 89 is connected with the plunger 101 of a solenoid 102 adapted to pull the crank in a direction for shifting the gates 97 downwardly, and said crank is also connected with an anchored retractile spring 103 effective to return the gates 97 upwardly when the solenoid 102 is deenergized. The upright crank 95 on the shaft 92 is connected with the plunger 104 of a solenoid 105 adapted to pull the crank in a direction for shifting the gates 99 downwardly, and said crank is also connected with an anchored retractile spring 106 effective to return the gates 99 upwardly when the solenoid 105 is deenergized.

Attention is directed to Figures 1 and 2 from which it will be apparent that latch plungers may be provided for locking the gates in selected can supply intercepting positions, one such plunger 107 being provided for co-operation with the crank 93, and one 108 for cooperation with the crank 95. The plungers 107 and 108 are slidable in guides 109 supported on the frame extension 87 and are spring urged as at 110 to constantly tend to project behind the respective cranks 93 and 95 to lock one or the other of them in its gate depressing position. When either arm 107 or 108 is not locked behind the associated crank, it will bear against the side of said crank in the manner illustrated in Figures 1 and 2 so as to be subject to snapping behind said crank as the crank is moved to clear the same, as to the left in Figure 2. The plungers 107 and 108 are connected by a manually operable actuator member 111.

Can row end stops 112 are provided, and these are best illustrated in Figures 2, 7 and 8, and in the diagrammatic illustration in Figure 10. One such end stop is provided at the end of each row supporting bar 82, and means is provided for placing these end stops in cooperative relation to the gate sets 97, 99 to provide alternate long and short can rows or layers. This alternate arrangement of long and short rows and the centering of the short rows with relation to the long rows between which they ultimately engage serves to stagger and nest the rows in the manner clearly illustrated in dot and dash lines in Figure 2. The end stops 112 are mounted on a carrier bar 113 from which guide members 114 project, said guide members being horizontally slidable in supporting bearings 115 which are secured as at 116 on the machine framing.

The end stop supporting bar 113 has a pin 117 projecting from each end thereof, and each said pin engages in a longitudinal slot 118 in the upper end of an end stop placer arm 119 which is uprightly disposed and pivotally supported intermediately of its ends as at 120. The lower end of each arm 119 is longitudinally slotted as at 121 to receive an arm shifter pin 122 projecting from an actuator disk 123 secured on the previously mentioned chain driven shaft 51.

The sizes of the sprockets 50 on the shaft 51, the eccentric positioning of the crank pins 122, and the spacing of the pins 117 and 122 with relation to the arm center 120 are such that each step downwardly imparted to the platen 17 will serve to move the arms 19 from one of the positions illustrated in Figure 7 or 8 to the other of the positions illustrated in said figures, and this movement imparted to the upper ends of the arms will serve to move the end stops to one or the other of the shifted positions illustrated in Figures 7 and 8, or in other words, the distance of a can radius, to provide for the arrangement of long or short rows and layers of cans. It will be apparent that when the end stops 112 are positioned as shown in Figure 7 and the cooperating gates 97 are effectively lowered as shown in Figure 2 a long row of eight cans will be arranged in each of the five rows of the layer. It will also be apparent that when the end stops 112 are shifted to the position illustrated in Figure 8 and the cooperating gates 99 are lowered into effective, can supply intercepting position, said end stops and gates will cooperate in providing short rows of seven cans each throughout the layer.

A switch actuator plunger 124 projects through the can engaging face of each end stop 112 and is slidable in a bearing 125 provided on the stop. Each said plunger is disposed to engage with the actuator button 126 of a normally open switch 127 which is movable with the respective stop. It will be apparent by reference to Figure 10 that the switches 127 are connected in series by conductor lines 128 also connecting with one of the lines 129 of the power lines 129 and 130. The conductor lines 128 also connect at 131 with two normally open solenoid selector switches 132 and 133 which are mounted on a support 134 in position for having their actuator buttons 135 and 136 alternately engaged by the lower end of one of the arms 119 as it is swung back and forth incidental to the successive step movements of the platen 17. The switch 132 is connected by a line 137 with the solenoid 105 which is in turn connected by a line 138 with the power line 130. The switch 133 is connected by a line 139 with the solenoid 102 which is in turn connected by the line 140 with the power line 130.

A yoke retainer latch 141 is secured on a shaft 142 which is rockable in bearings 143 supported on the framing in the manner best illustrated in Figures 1 and 2. The latch includes a cam nose portion 144 which projects through an opening 145 provided in one of the guide channels 8 into position for intercepting and being displaced by downward movement of one of the cross heads 40. A torsion spring 146 yieldably urges the latch to its latching position shown in Figure 2, and it will be apparent that as the yoke 39 is lowered to the position illustrated in dot and dash lines in Figure 2 the latch 141, 144 will engage over the cross head 40 and secure the yoke against upward movement when the load of the can complement is removed from the support plate 43 by removal of the dolly. A treadle 147 is attached to the rock shaft 142 and may be depressed by the operator to release the yoke 39 at the proper time and permit a returning of the plate 43 to the initial can layer receiving position shown in full lines in Figure 2.

After a full complement of can layers has been received in the form in the manner illustrated in dot and dash lines in Figure 2, the particular platen can be moved away with the dolly. At the sealing station the free ends of the wrapper W may be drawn over the top of the assembly or grouping of cans and sealed as indicated at 148 in Figure 11. It is to be understood that by reason of the provision of the end wall block 15, best shown in Figures 2, 3 and 9 of the drawings, the first downward movement of the platen will serve to bring about an upward folding of an edge portion of the wrapper as indicated at 149 by reason of the engagement of the downwardly moving wrapper edge portion with the stationary block 15. The clearances 16 at the sides of the block will permit this folding without interfering with the vertical projections of the wrapper edge portions. After the sealing of the bottom wall portion 149, the side portions 150, and then the top portion 151 can be folded over and sealed. This folding and sealing operation at 150 and 151 at the right end illustrated in Figure 11 takes place after the package has been dumped from the form, and it is to be understood that the folding and sealing of the marginal edges at the other end of the packages will be accomplished before the package is so dumped. By tilting the open end of the form upwardly, placing the detent 36 in the notch 34, said last mentioned folding and sealing can be facilitated. It will also be apparent that by tilting the open end of the form downwardly, as by inserting the detent in the notch 35, the discharging of the package can be facilitated.

*Operation*

Describing the operation of the example apparatus herein disclosed, and the method of arranging and wrapping cans said apparatus is designed to practice, it will be assumed that one dolly with its form filled with a package complement of cans resting on the partially shaped wrapper over the removable platen 17 has been moved away toward the wrapping station as indicated at the right in Figure 1, and that the other dolly has been moved into place to receive a wrapper and a package complement of cans. At this time the yoke 39 will be in the lowered position shown in dotted lines at the bottom of Figure 2, with the support plate 43 in position to have a platen 17 rest thereon while engaging at its edges 18 in the form wall channels 13, said parts being held in this position by the retaining latch 141, 144 shown at the lower right portion of the figure. A platen 17 can be moved into place with the dolly, or it can be placed over the support plate 43 after the dolly has been placed as shown in Figure 2 with its rollers 26 engaging in the locating recesses 28 so as to be accurately placed with relation to the several mechanisms of the apparatus.

It should be understood that the previous form loading will have left the control devices with the end stops placed for receiving long rows, or a long layer of cans, the gates 97 will be down, as shown in Figure 2 and will be latched in this position by the plunger 107, the solenoid 102 at this time being deenergized, however since there are no can rows present to engage the switches 127.

The operator depresses the treadle 147 to release the latch 141, 144 and permit the weights 56, 57, 77, 78 to bring about a lifting of the yoke 39, plate 43 and platen 17 to the position shown in full lines in Figures 2 and 3. While the yoke, plate and platen are moving upwardly, and the weights downwardly, the pairs 77, 78 of the latter being successively replaced on their respective supporting rings 67, the arms 119 will be oscillated to move the end stops 112 back and forth, but since there are no can rows present to actuate the switches 127 there will be no alternate energizing of the solenoids 102 and 105 such as takes place during loading of the platen. By reason of the engagement of the base weight guides 58 with the guide supporting angles 62 the platen will come to rest in the position shown in Figures 2 and 3, with the end stops 112 and gates 97 placed for the long row, long layer control, and with the arms 119 placed as shown for engaging the switch connected in the circuit with the solenoid 102 so that the latter will be energized to effectively place the gates 97 when long rows of a long layer of cans have been run in and effect an actuation of the control switches 127.

After first making certain that the can row supporting bars 82 have been slid into position for receiving and supporting the can rows, the operator manipulates the actuater 111 to release the latch plunger 107 and allow the spring 103 to lift the gates 97 and free cans in the guides 80 to roll onto the support bars 82 between the previously placed can row separating and guiding tier sheets 88. When all can rows are filled and the endmost cans in all have engaged the switch actuator plungers 124, all of the switches 127 and the switch 133 will function to complete the control circuit, energizing the solenoid 102 and again placing the gates in the can supply intercepting position shown in Figure 2. It must be understood also that the operator draws a wrapper length of paper W from the roll and places the same over the guides or supports 71 and 73 and the platen 17 as shown in Figure 2, severing the same by proper manipulation of the cutting means 70.

By now withdrawing the support bars 82 the assembled long layer of cans can be deposited onto the underlying wrapper W and the platen 17 supporting the same. The weight of the layer of cans will cause the platen 17, plate 43 and yoke 39 to descend, the cans moving the paper down with them and causing it to fold upwardly about the sides of the cans. The movement downwardly of one side edge of the paper W past the upper edge of the wall block 15 will also serve to fold said edge portion upwardly to form the partial end fold shown at 149 in Figure 11. This downward movement of the platen, plate and yoke will continue by action of gravity, the weight of the can layer overbalancing the lifting effort of the weights 56, 57 until the latter engage and are stopped by the first encountered base weight 77, and this will conclude the first lowering step of the platen, during which the arms 119 will have been moved from the position shown in Figures 2, 7 and 10 to that shown in Figure 8. This new placement of the arms 119 sets the stops 112 for a short row, short layer control, and conditions the switch 132 for subsequent cooperation with the switches 127 in energizing the solenoid 105 to automatically lower the gates when the short row, short layer cans come against the actuator plungers 124. As in the previously described layer run in, the cans in the guides 80 are released by manipulation of the actuator 111, the bars 82 having been placed in can row supporting position previously as before described. When the short rows of cans have been run in and actuated the switches 127, the energizing of the solenoid 105 will automatically drop the gates 99 so as to cooperate with the end stops 112 in placing the short rows and short layer for nesting in staggered relation with the underlying layer as the operator withdraws the support bars and deposits the short layer of cans onto said underlying long layer. The platen, plate and yoke will be again lowered automatically and by action of gravity by imposition of the weight of the short layer of cans thereon, and this lowering step will continue until the first sets of weights 77, 78 come against and are stopped by the weight sets 77, 78 immediately thereabove, the end stops 112 and the gates 97 again being placed in the Figure 2 position in the manner previously described. These operations are repeated until the form is filled with the full package complement of alternately staggered and nested long and short can layers as shown in dotted lines in Figure 2. This complete lowering of the platen 17 places the down-turned edges 18 thereof in the form wall channels 13 so that when the dolly is moved away to the wrapper sealing station the platen will readily strip off and slip over the top of the support plate 43, the bevelled edges 45 facilitating this action. As the platen reaches the fully lowered position the latch means 44, 41 will act automatically to secure the yoke in the lowered position after the dolly has been moved to displace the weight of the can complement from the support plate 43.

From the foregoing description, taken in connection with the accompanying drawings, it is thought that the construction and operation of the apparatus, and the manner of performing the steps of the method will be apparent to those skilled in the art to which the invention relates. While an example form of the apparatus, and example steps of the method have been disclosed herein, it is to be understood that said structure and steps may be variously changed without departing from the spirit and scope of the invention as defined in the appended claims.

I claim:

1. The herein described method of arranging cans and wrapping them to form a compact package, said method comprising, placing a wrapper length horizontally over a supporting plate located between two upright side walls, rolling cans on their sides in multiple side-by-side rows into layer arrangement over the plate and placing each individual layer of cans thus assembled on the plate over the wrapper length intermediately of the length thereof, lowering the plate step-by-step by gravity action as the layers of cans are successively placed thereon, counterpoising the plate during each lowering movement and stopping each movement of the plate downward after it has progressed approximately the diameter of a can so as to provide a new can layer receiving space between the walls and cause the wrapper length to be folded upwardly at the sides of the layers as successive layers are thus lowered with the plate and superposed one upon another, and after thus assembling a predetermined number of layers on the wrapper, folding the wrapper length ends over the uppermost layer of cans and projecting side edge portions thereof over end portions of the assembled can layers and sealing said ends and edge portions to complete the package.

2. The method as defined in claim 1 and including the additional steps of placing a tier sheet between each two adjacent can rows of a layer and endwise of each endmost row so that the tier sheets will separate the rows and rest freely upon the supporting plate so as to be lowered step-by-step with said plate as the successively laid layers are lowered, the endmost tier sheets forming end closures at the respective ends of the package, and the wrapper side edge portions being folded and sealed against said endmost tier sheets.

3. The method as defined in claim 1 further characterized by the fact that in the placing of the cans of alternate layers one less can will be placed in each row of said alternate layer than were placed in each row of the previously placed layer, with the thus formed short layers centered with relation to the other layers between which they are placed so that they will bear a staggered and nested row relation to said other layers.

4. The herein described method of arranging cans and wrapping them to form a compact package, said method comprising, placing a wrapper length horizontally over a supporting plate located between two upright side walls, rolling cans on their sides into multiple row layer relation and supporting each layer as the layers are successively arranged above the supported wrapper, removing the support for each successively arranged layer by moving the support perpendicularly to the axes of the cans so as to drop the cans onto the wrapper and plate one can of each row at a time and lowering the plate step-by-step by gravity action as the layers of cans are successively placed thereon, counterpoising the plate during each lowering movement and stopping each movement of the plate downward after it has progressed approximately the diameter of a can so as to provide a new can layer receiving space between the walls and cause the wrapper to be folded upwardly at the sides of the layers as successive layers are thus lowered and superposed on the plate, folding the wrapper length ends over the uppermost layer of cans and projecting side edge portions thereof over end portions of the assembled can layers and sealing said ends and edge portions to complete the package.

5. The herein described method of arranging cans and wrapping them to form a compact package, said method comprising, placing a wrapper length horizontally over a supporting plate located between two upright side walls, placing tier sheets uprightly in parallel spaced relation over the table and on said wrapper length so that each adjacent two sheets form between them a can row guideway, rolling cans on their sides into multiple row layer relation with each row between two tier sheets and supporting each layer as the layers are successively arranged above the plate supported wrapper length, removing the support for each successively arranged layer by moving the support horizontally and perpendicularly to the can axes so as to drop the cans onto the wrapper length and plate one can of each row at a time and whereby the weight of the cans of each layer thus deposited will cause the plate to be lowered by action of gravity and the wrapper to be folded upwardly at the sides of the layers as successive layers are thus lowered and superposed on the plate, counterpoising the plate during each lowering movement and stopping each movement of the plate downward after it has progressed approximately the diameter of a can, the tier sheets being lowered with the wrapper length plate and can layers with the endmost tier sheets forming end closures at the respective ends of the package, folding the wrapper length ends over the uppermost layer of cans and projecting side edge portions thereof against said endmost tier sheets, and sealing said ends and edge portions to complete the package.

6. The herein described method of arranging cans and wrapping them to form a compact package, said method comprising, placing a wrapper length horizontally over a supporting plate located between two upright side walls, placing tier sheets uprightly in parallel spaced relation over the table and on said wrapper length so that each adjacent two sheets form between them a can row guideway, rolling cans on their sides into multiple row layer relation with each row between two tier sheets and supporting each layer as the layers are successively arranged above the plate supported wrapper length, each alternately arranged layer being arranged with one less can in each row thereof than were placed in each row of the previously arranged layer, and the thus formed short layers being centered with relation to the other layers between which they are placed so that they will bear a staggered and nested row relation to said other layers, removing the support for each successively arranged layer by moving the support horizontally and perpendicularly to the can axes so as to drop the cans onto the wrapper length and plate one can of each row at a time and whereby the weight of the cans of each layer thus deposited will cause the plate to be lowered by action of gravity and the wrapper to be folded upwardly at the sides of the layers as successive layers are thus lowered and superposed on the plate, counterpoising the plate during each lowering movement and stopping each movement of the plate downward after it has progressed approximately the diameter of a can, the tier sheets being lowered with the wrapper length plate and can layers with the endmost tier sheets forming end closures at the respective ends of the package, folding the wrapper length ends over the uppermost layer of cans and projecting side edge portions thereof against said endmost tier sheets, and sealing said ends and edge portions to complete the package.

7. In apparatus of the character described, a vertically movable horizontally disposed support plate, upright parallel side walls cooperating with the plate in providing a form in which to receive superposed layers of cans each layer composed of a plurality of rows of cans arranged side by side, means for supporting a wrapper length with its intermediate portion over the plate and its ends extending at each side beyond said plate, means for successively placing layers of cans on said wrapper length and between said walls, and counterpoise means for supporting said plate and initially holding it near the top of said walls to receive the first placed can layer and being yieldable to the weight of the successively placed can layers so that as each layer of cans is placed on the wrapper and plate the weight thereof will cause the plate to move downward and including stop devices effective to limit downward movement of the plate after it has progressed approximately the diameter of a can following each deposition of a layer of cans thereon to provide a space in which to receive another layer of cans at the top and also to cause the wrapper length to be folded upwardly at the sides of the layers as successive layers of cans are thus lowered with the plate.

8. Apparatus as defined in claim 7 in which there are also included means for holding tier sheets uprightly between each two rows of the cans of a layer and endwise of each endmost row of cans as a package end closure and with their lower edges resting on the wrapper to be lowered with the same and the plate as the layers are successively placed.

9. Apparatus as defined in claim 7 in which the side walls are connected by an end wall having a rectangular block projecting inwardly therefrom with side edge clearances between it and the side walls into which side edge portions of the wrapper can project, said block being effective during the first step lowering of the plate to form an upward fold in a side edge portion of the wrapper.

10. Apparatus as defined in claim 7 in which there are also included means for holding tier sheets uprightly between each two rows of the cans of a layer and endwise of each endmost row of cans as a package end closure and with their lower edges resting on the wrapper to be lowered with the same and the plate as the layers are successively placed and in which the side walls are connected by an end wall having a rectangular block projecting inwardly therefrom with side edge clearances between it and the side walls into which side edge portions of the wrapper can project, said block being effective during the first step lowering of the plate to form an upward fold in a side edge portion of the wrapper against the tier sheet at the particular end of the package.

11. Apparatus as defined in claim 7 in which the plate supporting counterpoise means includes a flexible carrier having connection with the plate for being moved as the plate is lowered by action of gravity, and guide means suspending a portion of the flexible carrier to be lifted as the plate is moved downwardly, said suspended flexible carrier portion having a counterpoise weight thereon counterpoising the plate, and in which the stop devices include means for supporting a plurality of supplementary weights placed can layer depth distances above the lowermost or plate elevated position of the counterpoise weight to be successively engaged and lifted as the counterpoise weight moves up step-by-step, each of said supplementary weights first serving as a stop limiting a downward step movement of the plate as the underlying counterpoise or supplementary weight comes against it under the weight of the last placed layer of cans, and then to be lifted and moved against the next overlying supplementary weight as the weight of another layer of cans is imposed upon the plate.

12. Apparatus as defined in claim 7 in which the plate supporting counterpoise means includes a flexible carrier having connection with the plate for being moved as the plate is lowered by action of gravity, and guide means suspending a portion of the flexible carrier to be lifted as the plate is moved downwardly, said suspended flexible carrier portion having a counterpoise weight thereon counterpoising the plate, and in which the stop devices include means for supporting a plurality of supplementary weights placed can layer depth distances above the lowermost or plate elevated position of the counterpoise weight to be successively engaged and lifted as the counterpoise weight moves up step-by-step, each of said supplementary weights first serving as a stop limiting a downward step movement of the plate as the underlying counterpoise or supplementary weight comes against it under the weight of the last placed layer of cans, and then to be lifted and moved against the next overlying supplementary weight as the weight of another layer of cans is imposed upon the plate, means also being included for individually and collectively adjusting the positions of said plurality of weights.

13. Apparatus as defined in claim 7 in which the plate supporting counterpoise means includes a yoke traversing the space beneath the parallel walls and having post means extending upwardly therefrom between said walls and having supporting connection with said plate, vertical guides engaged by the ends of the yoke, a flexible carrier attached to each yoke end and passing upwardly therefrom and thence downwardly over guide means, each said downwardly extending flexible carrier portion having a counterpoise weight thereon, said weights counterpoising the plate and yoke so as to tend to hold them at any elevation to which they may be moved, and in which the stop devices include in association with each said downwardly extending flexible carrier portion and its counterpoise weight means for supporting a plurality of supplementary weights placed can layer depth distances above the lowermost or plate elevated position of the particular counterpoise weight to be successively engaged and lifted as the counterpoise weights move up step-by-step the supplementary weight pairs first serving as a stop means limiting a downward step movement of the plate and yoke as the underlying counterpoise or supplementary weights come against them under the weight of the last placed layer of cans, and then to be lifted and moved against the next overlying supplementary weight pair as the weight of another layer of cans is imposed upon the plate.

14. Apparatus as defined in claim 7 in which the plate supporting counterpoise means includes a yoke traversing the space beneath the parallel walls and having post means extending upwardly therefrom between said walls and having supporting connection with said plate, vertical guides engaged by the ends of the yoke, a flexible carrier attached to each yoke end and passing upwardly therefrom and thence downwardly over guide means, each said downwardly extending flexible carrier portion having a counterpoise weight thereon, said weights counterpoising the plate and yoke so as to tend to hold them at any elevation to which they may be moved, and in which the stop devices include in association with each said downwardly extending flexible carrier portion and its counterpoise weight means for supporting a plurality of supplementary weights placed can layer depth distances above the lowermost or plate elevated position of the particular counterpoise weight to be successively engaged and lifted as the counterpoise weights move up step-by-step the supplementary weight pairs first serving as a stop means limiting a downward step movement of the plate and yoke as the underlying counterpoise or supplementary weights come against them under the weight of the last placed layer of cans, and then to be lifted and moved against the next overlying supplementary weight pair as the weight of another layer of cans is imposed upon the plate, there being included also manually releasable latch means for securing the yoke when it reaches its fully lowered position in which the wrapper has its full complement of can layers assembled thereon.

15. Apparatus as defined in claim 7 in which the means for successively placing layers of cans on the supported wrapper length includes horizontally disposed support bar means disposed in parallel spaced relation to and above said wrapper length when the plate is at its fully lifted position, and means for successively arranging can layers on said bar means, said bar means being removable horizontally in a direction perpendicularly to the axes of the cans after the arranging of each layer of cans thereon to drop the cans of each layer onto the underlying wrapper and plate or previously laid layer thereon one can in each row at a time.

16. Apparatus as defined in claim 7 in which the means for successively placing layers of cans on the supported wrapper length includes horizontally disposed support bar means disposed in parallel spaced relation to and above said wrapper length when the plate is at its fully lifted position, and means for successively arranging can layers on said bar means, said bar means being removable horizontally in a direction perpendicular to the axes of the cans after the arranging of each layer of cans thereon to drop the cans of each layer onto the underlying wrapper and plate or previously laid layer thereon one can in each row at a time, said can layer arranging means including devices effective to arrange each alternately arranged layer with one less can in each row thereof than were placed in each row of the previously arranged layer, with the thus formed short layers centered with relation to the other layers between which they are to be placed so that the can layers ultimately will bear a staggered and nested row relation.

17. Apparatus as defined in claim 7 in which the means for successively placing layers of cans on the supported wrapper length includes horizontally disposed support bar means disposed in parallel spaced relation to and above said wrapper length when the plate is at its fully lifted position, and means for successively arranging can layers on said bar means, said bar means being removable horizontally in a direction perpendicularly to the axes of the cans after the arranging of each layer of cans thereon to drop the cans of each layer onto the underlying wrapper and plate or previously laid layer thereon one can in each row at a time, said can layer arranging means including guides through which the rows of cans forming each layer are rolled on their sides into position on the support bar means, end stops for fixing the end position of each rolled in row of cans, and gate means for cutting off the inrolling of can rows and fixing the length of the rows, and means for varying the spacing of each end stop and a cooperating gate incidental to the arranging of alternate layers so as to arrange each alternately arranged layer with one less can in each row thereof than were placed in each row of the previously arranged layer, with the thus formed short layers centered with relation to the other layers between which they are to be placed so that the can layers ultimately will bear a staggered and nested row relation.

18. Apparatus as defined in claim 7 in which the means for successively placing layers of cans on the supported wrapper length includes horizontally disposed support bar means disposed in parallel spaced relation to and above said wrapper length when the plate is at its fully lifted position, and means for successively arranging can layers on said bar means, said bar means being removable horizontally in a direction perpendicularly to the axes of the cans after the arranging of each layer of cans thereon to drop the cans of each layer onto the underlying wrapper and plate or previously laid layer thereon one can in each row at a time, said can layer arranging means including guides through which the rows of cans forming each layer are rolled on their sides into position on the support bar means, end stops for fixing the end position of each rolled in row of cans, and gate means for cutting off the inrolling of can rows and fixing the length of the rows, and means for varying the spacing of each end stop and a cooperating gate incidental to the arranging of alternate layers so as to arrange each alternately arranged layer with one less can in each row thereof than were placed in each row of the previously arranged layer, with the thus formed short layers centered with relation to the other layers between which they are to be placed so that the can layers ultimately will bear a staggered and nested row relation, said end stops being arranged in can row contacting face alignment and being movable back and forth the distance of a can radius for the successive can layer arrangements, and said gates being arranged in pairs over each can row, the gates of each pair being selectively placeable in can intercepting position and spaced apart the distance of a can radius.

19. Apparatus as defined in claim 7 in which the means for successively placing layers of cans on the supported wrapper length includes horizontally disposed support bar means disposed in parallel spaced relation to and above said wrapper length when the plate is at its fully lifted position, and means for successively arranging can layers on said bar means, said bar means being removable horizontally in a direction perpendicularly to the axes of the cans after the arranging of each layer of cans thereon to drop the cans of each layer onto the underlying wrapper and plate or previously laid layer thereon one can in each row at a time, said can layer arranging means including guides through which the rows of cans forming each layer are rolled on their sides into position on the support bar means, end stops for fixing the end position of each rolled in row of cans, and gate means for cutting off the inrolling of can rows and fixing the length of the rows, and means for varying the spacing of each end stop and a cooperating gate incidental to the arranging of alternate layers so as to arrange each alternately arranged layer with one less can in each row thereof than were placed in each row of the previously arranged layer, with the thus formed short layers centered with relation to the other layers between which they are to be placed so that the can layers ultimately will bear a staggered and nested row relation, said end stops being arranged in can row contacting face alignment and being movable back and forth the distance of a can radius for the successive can layer arrangements, and said gates being arranged in pairs over each can row, the gates of each pair being selectively placeable in can intercepting position and spaced apart the distance of a can radius, and there being included also means operable by each downward step movement of the plate for controlling the placement of said end stops and gates.

20. In apparatus of the character described, a vertically movable horizontally disposed support plate, upright parallel side walls cooperating with the plate in providing a form in which to receive superposed layers of cans each layer composed of a plurality of rows of cans arranged side by side, means for successively placing layers of cans on said plate, means for supporting the plate and initially holding it near the top of said walls to receive the first placed can layer, means for controlling movement of the plate step-by-step downwardly to receive the successively placed can layers, said layer placing means including horizontally disposed support bar means disposed in parallel spaced relation above the plate when said plate is at its fully lifted position, and means for successively arranging can layers on said bar means, said bar means being removable after the arranging of each layer of cans thereon to drop the arranged can layer onto the underlying plate or previously laid layer of cans thereon, said can layer arranging means including guides through which the rows of cans forming each layer are rolled on their sides into position on the support bar means, end stops for fixing the end position of each rolled in row of cans, and gate means for cutting off the inrolling of can rows and fixing the length of the rows, and means for varying the spacing of each end stop and a cooperating gate incidental to the arranging of alternate layers so as to arrange each alternately arranged layer with one less can in each row thereof than were placed in each row of the previously arranged layer, with the thus formed short layers centered with relation to the other layers between which they are to be placed so that the can layers ultimately will bear a staggered and nested row relation.

21. In apparatus of the character described, a vertically movable horizontally disposed support plate, upright parallel side walls cooperating with the plate in providing a form in which to receive superposed layers of cans each layer composed of a plurality of rows of cans arranged side by side, means for successively placing layers of cans on said plate, means for supporting the plate and initially holding it near the top of said walls to receive the first placed can layer, means for controlling movement of the plate step-by-step downwardly to receive the successively placed can layers, said layer placing means including horizontally disposed support bar means disposed in parallel spaced relation above the plate when said plate is at its fully lifted position, and means for successively arranging can layers on said bar means, said bar means being removable after the arranging of each layer of cans thereon to drop the arranged can layer onto the underlying plate or previously laid layer of cans thereon, said can layer arranging means including guides through which the rows of cans forming each layer are rolled on their sides into position on the support bar means, end stops for fixing the end position of each rolled in row of cans, and gate means for cutting off the inrolling of can rows and fixing the length of the rows, and means for varying the spacing of each end stop and a cooperating gate incidental to the arranging of alternate layers so as to arrange each alternately arraged layer with one less can in each row thereof than were placed in each row of the previously arranged layer, with the thus formed short layers centered with relation to the other layers between which they are to be placed so that the can layers ultimately will bear a staggered and nested row relation, said end stops being arranged in can row contacting face alignment and being movable back and forth the distance of a can radius for the successive can layer arrangements, and said gates being arranged in pairs over each can row, the gates of each pair being selectively placeable in can intercepting position and spaced apart the distance of a can radius.

22. In apparatus of the character described, a vertically movable horizontally disposed support plate, upright parallel side walls cooperating with the plate in providing a form in which to receive superposed layers of cans each layer composed of a plurality of rows of cans arranged side by side, means for successively placing layers of cans on said plate, means for supporting the plate and initially holding it near the top of said walls to receive the first placed can layer, means for controlling movement of the plate step-by-step downwardly to receive the successively placed can layers, said layer placing means including horizontally disposed support bar means disposed in parallel spaced relation above the plate when said plate is at its fully lifted position, and means for successively arranging can layers on said bar means, said bar means being removable after the arranging of each layer of cans thereon to drop the arranged can layer onto the underlying plate or previously laid layer of cans thereon, said can layer arranging means including guides through which the rows of cans forming each layer are rolled on their sides into position on the support bar means, and stops for fixing the end position of each rolled in row of cans, and gate means for cutting off the inrolling of can rows and fixing the length of the rows, and means for varying the spacing of each end stop and a cooperating gate incidental to the arranging of alternate layers so as to arrange each alternately arranged layer with one less can in each row thereof than were placed in each row of the previously arranged layer, with the thus formed short layers centered with relation to the other layers between which they are to be placed so that the can layers ultimately will bear a staggered and nested row relation, said end stops being arranged in can row contacting face alignment and being movable back and forth the distance of a can radius for the successive can layer arrangements, and said gates being arranged in pairs over each can row, the gates of each pair being selectively placeable in can intercepting position and spaced apart the distance of a can radius, and there being included also means operable by each downward step movement of the plate for controlling the placement of said end stops and gates.

23. In apparatus of the character described, a vertically movable horizontally disposed support plate, upright parallel side walls cooperating with the plate in providing a form in which to receive superposed layers of cans each layer composed of a plurality of rows of cans arranged side by side, means for successively placing layers of cans on said plate, means for supporting the plate and initially holding it near the top of said walls to receive the first placed can layer, means for controlling movement of the plate step-by-step downwardly to receive the successively placed can layers, said layer placing means including horizontally disposed support bar means disposed in parallel spaced relation above the plate when said plate is at its fully lifted position, and means for successively arranging can layers on said bar means, said bar means being removable after the arranging of each layer of cans thereon to drop the arranged can layer onto the underlying plate or previously laid layer of cans thereon, said can layer arranging means including guides through which the rows of cans forming each layer are rolled on their sides into position on the support bar means, end stops for fixing the end position of each rolled in row of cans, and gate means for cutting off the inrolling of can rows and fixing the length of the rows, and means for varying the spacing of each end stop and a cooperating gate incidental to the arranging of alternate layers so as to arrange each alternately arranged layer with one less can in each row thereof than were placed in each row of the previously arranged layer, with the thus formed short layers centered with relation to the other layers between which they are to be placed so that the can layers ultimately will bear a staggered and nested row relation, said end stops being arranged in can row contacting face alignment and being movable back and forth the distance of a can radius for the successive can layer arrangements, and said gates being arranged in pairs over each can row, the gates of each pair being selectively placeable in can intercepting position and spaced apart the distance of a can radius, and there being included also means operable by each downward step movement of the plate for controlling the placement of said end stops and comprising a chain and connections causing it to move as the plate is moved, a sprocket and shaft rotated by movement of the chain, an oscillatable actuator arm connected with the end stops, and crank pin and slot connections between the shaft and actuator arm for imparting movements of adjustment to the arm and the connected end stops.

24. In apparatus of the character described, a vertically movable horizontally disposed support plate, upright parallel side walls cooperating with the plate in providing a form in which to receive superposed layers of cans each layer composed of a plurality of rows of cans arranged side by side, means for successively placing layers of cans on said plate, means for supporting the plate and initially holding it near the top of said walls to receive the first placed can layer, means for controlling movement of the plate step-by-step downwardly to receive the successively placed can layers, said layer placing means including horizontally disposed support bar means disposed in parallel spaced relation above the plate when said plate is at its fully lifted position, and means for successively arranging can layers on said bar means, said bar means being removable after the arranging of each layer of cans thereon to drop the arranged can layer onto the underlying plate or previously laid layer of cans thereon, said can layer arranging means including guides through which the rows of cans forming each layer are rolled on their sides into position on the support bar means, and stops for fixing the end position of each rolled in row of cans, and gate means for cutting off the inrolling of can rows and fixing the length of the rows, and means for varying the spacing of each end stop and a cooperating gate incidental to the arranging of alternate layers so as to arrange each alternately arranged layer with one less can in each row thereof than were placed in each row of the previously arranged layer, with the thus formed short layers centered with relation to the other layers between which they are to be placed so that the can layers ultimately will bear a staggered and nested row relation, said end stops being arranged in can row contacting face alignment and being movable back and forth the distance of a can radius for the successive can layer arrangements, and said gates being arranged in pairs over each can row, the gates of each pair being selectively placeable in can intercepting position and spaced apart the distance of a can radius, and there being included also means operable by each downward step movement of the plate for controlling the placement of said end stops and comprising a chain and connections causing it to move as the plate is moved, a sprocket and shaft rotated by movement of the chain, an oscillatable actuator arm connected with the end stops, and crank pin and slot connections between the shaft and actuator arm for imparting movements of adjustment to the arm and the connected end stops, and means also controlled by movement of said actuator arm for placing the gates in cooperative relation to the end stops.

25. In apparatus of the character described, a vertically movable horizontally disposed support plate, upright parallel side walls cooperating with the plate in providing a form in which to receive superposed layers of cans each layer composed of a plurality of rows of cans arranged side by side, means for successively placing layers of cans on said plate, means for supporting the plate and initially holding it near the top of said walls to receive the first placed can layer, means for controlling movement of the plate step-by-step downwardly to receive the successively placed can layers, said layer placing means including horizotally disposed support bar means disposed in parallel spaced relation above the plate when said plate is at its fully lifted position, and means for successively arranging can layers on said bar means, said bar means being movable after the arranging of each layer of cans thereon to drop the arranged can layer onto the underlying plate or previously laid layer of cans thereon, said can layer arranging means including guides through which the rows of cans forming each layer are rolled on their sides into position on the support bar means, end stops for fixing the end position of each rolled in row of cans, and gate means for cutting off the inrolling of can rows and fixing the length of the rows, and means for varying the spacing of each end stop and a cooperating gate incidental to the arranging of alternate layers so as to arrange each alternately arranged layer with one less can in each row thereof than were placed in each row of the previously arranged layer, with the thus formed short layers centered with relation to the other layers between which they are to be placed so that the can layers ultimately will bear a staggered and nested row relation, said end stops being arranged in can row contacting face alignment and being movable back and forth the distance of a can radius for the successive can layer arrangements, and said gates being arranged in pairs over each can row, the gates of each pair being selectively placeable in can intercepting position and spaced apart the distance of a can radius, and there being included also means operable by each downward step movement of the plate for controlling the placement of said end stops and comprising a chain and connections causing it to move as the plate is moved, a sprocket and shaft rotated by movement of the chain, an oscillatable actuator arm connected with the end stops, and crank pin and slot connections between the shaft and actuator arm for imparting movements of adjustment to the arm and the connected end stops, solenoid means for effecting placement of the gates, and control circuit means for the solenoids and including spaced switches, said actuator arm being engageable with one switch in one of its positions to place the gates for cooperating with the end stops in the arrangement of long rows of cans and with the other switch in another position to place the gates for cooperation with the end stops in the arrangement of short rows of cans.

26. In apparatus of the character described, a vertically movable horizontally disposed support plate, upright parallel side walls cooperating with the plate in providing a form in which to receive superposed layers of cans each layer composed of a plurality of rows of cans arranged side by side, means for successively placing layers of cans on said plate, means for supporting the plate and initially holding it near the top of said walls to receive the first placed can layer, means for controlling movement of the plate step-by-step downwardly to receive the successively placed can layers, said layer placing means including horizontally disposed support bar means disposed in parallel spaced relation above the plate when said plate is at its fully lifted position, and means for successively arranging can layers on said bar means, said bar means being movable after the arranging of each layer of cans thereon to drop the arranged can layer onto the underlying plate or previously laid layer of cans thereon, said can layer arranging means including guides through which the rows of cans forming each layer are rolled on their sides into position on the support bar means, end stops for fixing the end postion of each rolled in row of cans, and gate means for cutting off the inrolling of can rows and fixing the length of the rows, and means for varying the spacing of each end stop and a cooperating gate incidental to the arranging of alternate layers so as to arrange each alternately arranged layer with one less can in each row thereof than were placed in each row of the previously arranged layer, with the thus formed short layers centered with relation to the other layers between which they are to be placed so that the can layers ultimately will bear a staggered and nested row relation, said end stops being arranged in can row contacting face alignment and being movable back and forth the distance of a can radius for the successive can layer arrangements, and said gates being arranged in pairs over each can row, the gages of each pair being selectively placeable in can intercepting position and spaced apart the distance of a can radius, and there being included also means operable by each downward step movement of the plate for controlling the placement of said end stops and comprising a chain and connections causing it to move as the plate is moved, a sprocket and shaft rotated by movement of the chain, an oscillatable actuator arm connected with the end stops, and crank pin and slot connections between the shaft and actuator arm for imparting movements of adjustment to the arm and the connected end stops, solenoid means for effecting placement of the gates, and control circuit means for the solenoids and including spaced switches, said actuator arm being engageable with one switch in one of its positions to place the gates for cooperating with the end stops in the arrangement of long rows of cans and with the other switch in another position to place the gates for cooperation with the end stops in the arrangement of short rows of cans, and said control circuit also having therein multiple switches connected in series one thereof being associated with each end stop and adapted to be closed when a completed row of cans is arrested by the particular end stop.

27. Apparatus as defined in claim 7 in which the side walls have inwardly projecting lower ledge portions and comprise portions of a dolly rollable away to a sealing station at which completion of the wrapping and sealing of the can package can be performed, and in which the support plate includes a removable platen on which the wrapper and can layers directly rest and which will rest upon and be supported by the side wall ledges and the dolly when the plate is fully lowered so that the platen can move away with the dolly.

28. Apparatus as defined in claim 7 in which the side walls have inwardly projecting lower ledge portions and comprise portions of a dolly rollable away to a sealing station at which completion of the wrapping and sealing of the can package can be performed, and in which the support plate includes a removably platen on which the wrapper and can layers directly rest and which will rest upon and be supported by the side wall ledges and the dolly when the plate is fully lowered so that the platen can move away with the dolly, said side walls having trunnion bearing on the dolly so that the walls and the platen and can package supported thereon can be tilted to facilitate completion of the package sealing and final discharging of the package.

29. Apparatus as defined in claim 7 in which the side walls have inwardly projecting lower ledge portions and comprise portions of a dolly rollable away to a sealing station at which completion of the wrapping and sealing of the can package can be performed, and in which the support plate includes a removable platen on which the wrapper and can layers directly rest and which will rest upon and be supported by the side wall ledges and the dolly when the plate is fully lowered so that the platen can move away with the dolly, two such dollies being provided so that they can be shuttled back and forth with one being loaded while the other is at the wrapper sealing and package discharging station.

30. Apparatus as defined in claim 7 in which the side walls have inwardly projecting lower ledge portions and comprise portions of a dolly rollable away to a sealing station at which completion of the wrapping and sealing of the can package can be performed, and in which the support plate includes a removable platen on which the wrapper and can layers directly rest and which will rest upon and be supported by the side wall ledges and the dolly when the plate is fully lowered so that the platen can move away with the dolly, two such dollies being provided so that they can be shuttled back and forth with one being loaded while the other is at the wrapper sealing and package discharging station, and trackways being provided for guiding movement of the dollies and having dolly roller receiving depressions therein serving to accurately place the dollies in the apparatus and also to impart a slight lift to the platen as each dolly is started away from the loading position, thereby to facilitate separation of the platen from the remainder of the support plate.

References Cited in the file of this patent

UNITED STATES PATENTS

| | | |
|---|---|---|
| 805,099 | Sage | Nov. 21, 1905 |
| 817,375 | Keyes | Apr. 10, 1906 |
| 1,208,802 | Lienau | Dec. 19, 1916 |
| 1,368,780 | Anderson | Feb. 15, 1921 |
| 1,851,457 | Smith | Mar. 29, 1932 |
| 2,024,189 | Spoor | Dec. 17, 1935 |
| 2,062,540 | Vogt | Dec. 1, 1936 |
| 2,291,645 | Nordquist | Aug. 4, 1942 |
| 2,318,444 | Wilson | May 4, 1943 |
| 2,510,343 | Krause | June 6, 1950 |
| 2,544,735 | Strickler | Mar. 13, 1951 |
| 2,565,927 | Morgan | Aug. 28, 1951 |
| 2,615,289 | Hickin | Oct. 28, 1952 |